(12) United States Patent
Williams

(10) Patent No.: US 8,497,477 B1
(45) Date of Patent: Jul. 30, 2013

(54) METHOD AND APPARATUS FOR EFFICIENT REMOVAL OF GAIN FLUCTUATION EFFECTS IN PASSIVE THERMAL IMAGES

(75) Inventor: Thomas D. Williams, Shutesbury, MA (US)

(73) Assignee: MVT Equity LLC, New York, NY (US)

( * ) Notice: Subject to any disclaimer, the term of this patent is extended or adjusted under 35 U.S.C. 154(b) by 372 days.

(21) Appl. No.: 13/024,790

(22) Filed: Feb. 10, 2011

Related U.S. Application Data

(60) Provisional application No. 61/303,103, filed on Feb. 10, 2010, provisional application No. 61/303,048, filed on Feb. 10, 2010.

(51) Int. Cl.
*G01T 1/00* (2006.01)

(52) U.S. Cl.
USPC ............ 250/336.1; 342/22; 342/27; 342/179; 342/189; 342/195

(58) Field of Classification Search
USPC .............. 250/336.1, 370.09; 342/22, 27, 179, 342/189, 195
See application file for complete search history.

(56) References Cited

U.S. PATENT DOCUMENTS

| | | | | |
|---|---|---|---|---|
| 4,521,861 A * | 6/1985 | Logan et al. | ..................... | 702/57 |
| 5,227,800 A * | 7/1993 | Huguenin et al. | ............ | 342/179 |
| 6,777,684 B1 * | 8/2004 | Volkov et al. | .............. | 250/341.1 |
| 6,791,487 B1 * | 9/2004 | Singh et al. | ..................... | 342/22 |
| 7,116,798 B1 | 10/2006 | Chawla | | |
| 7,167,123 B2 * | 1/2007 | Hausner et al. | .................. | 342/22 |
| 7,170,442 B2 * | 1/2007 | Lovberg et al. | .............. | 342/179 |
| 7,248,204 B2 * | 7/2007 | Lovberg et al. | ................. | 342/22 |
| 2004/0149909 A1 * | 8/2004 | Vaidya et al. | .............. | 250/338.1 |
| 2005/0151080 A1 * | 7/2005 | Vaidya | ........................ | 250/336.1 |
| 2006/0017605 A1 * | 1/2006 | Lovberg et al. | ................. | 342/22 |
| 2006/0022128 A1 * | 2/2006 | Vaidya | ........................ | 250/252.1 |
| 2008/0100504 A1 * | 5/2008 | Martin et al. | .................. | 342/179 |
| 2009/0289830 A1 * | 11/2009 | Pergande et al. | ............... | 342/22 |
| 2009/0294704 A1 * | 12/2009 | Zailer et al. | .................... | 250/580 |
| 2010/0214150 A1 * | 8/2010 | Lovberg et al. | ................. | 342/22 |

FOREIGN PATENT DOCUMENTS

EP 1884802 A1 2/2008

* cited by examiner

*Primary Examiner* — David Porta
*Assistant Examiner* — Taeho Jo
(74) *Attorney, Agent, or Firm* — Burns & Levinson LLP; Bruce D. Jobse, Esq.

(57) ABSTRACT

A system and technique for imaging a subject at a scene overcomes the weaknesses in the existing gain fluctuation techniques by switching the environmental temperature at the scene at a rate sufficiently fast enough to obtain subsequent samples in a time period where the gain has not fluctuated sufficiently to have a negative effect on detection sensitivity. This technique is utilized in conjunction with the method of subsequent subtraction of alternate samples which both reveals the reflectance of the scene and removes gain fluctuation.

15 Claims, 10 Drawing Sheets

US 8,497,477 B1

METHOD AND APPARATUS FOR EFFICIENT REMOVAL OF GAIN FLUCTUATION EFFECTS IN PASSIVE THERMAL IMAGES

CROSS REFERENCE TO RELATED APPLICATIONS

This application claims priority to the following U.S. Provisional Applications:

Ser. No. 61/303,048 filed Feb. 10, 2010, entitled Method and Apparatus for Detection of Concealed Objects in Passive Thermal Images Using Environment Control; and Ser. No. 61/303,103 filed Feb. 10, 2010, entitled Method and Apparatus for Efficient Removal of Gain Fluctuation Effects in Passive Thermal Images, the disclosures of which are incorporated herein by this reference for all purposes.

In addition, this application is filed on even date herewith U.S. Utility patent application Ser. No. 13/024,853, entitled Method and Apparatus for Detection of Concealed Objects in Passive Thermal Images Using Environment Control, the disclosure of which is also incorporated herein by this reference in its entirety for all purposes.

FIELD OF THE INVENTION

The disclosed system and technique relate to passive millimeter wave imaging, and, more particularly, to a system and technique for passive millimeter wave imaging for concealed object detection.

BACKGROUND OF THE INVENTION

Passive thermal images, including millimeter and other wavelengths, provide benefits in practical and safe detection of concealed objects on people. Such techniques are commonly performed by an instrument which creates images from radiometric detector(s). However, one of the main detractors in effective and affordable implementation of such systems is the detrimental effects of gain fluctuation. The effects of gain fluctuation can easily reduce thermal resolution by a factor of two or more, rendering what would otherwise be an effective system almost useless, as explained more fully below.

Various techniques exist for revealing concealed objects. In passive millimeter wave, and other wavelengths in general, imaging for concealed object detection on people, the natural radiation from the person, and the generally lower temperature environment in which the person is immersed, cause a reflective object on that person to reveal itself in contrast because the object reflects a lower temperature than the body radiates. However, in general, these systems employ radiometer(s) that contain electronic amplification and detection components, all of which perform a large amount of signal gain. Technological developments over the years have improved amplifiers so that they operate with a low amount of thermal noise. Such amplifiers, not unlike many electronic components, have gain fluctuation with a spectrum which generally increases in fluctuation amplitude as the frequency decreases. This kind of fluctuation is often referred to as "one over f noise" or simply "1/f" whether it is the spectrum of gain fluctuation, or fluctuation of other electronic functions such as the transfer function of a detector being the ratio of voltage output for power input.

During the period over which a sensor is sampled and employed to form an image, electronic gain fluctuates in amplitude. Those changes in gain result in a change in sensed amplitude or temperature from the scene. These gain-based changes are in addition to both actual thermal changes being sensed and other thermal-like noise sources including electronic ones. As a result, the image is degraded by the amount contributed by gain fluctuations in addition to that which it would otherwise be degraded from thermal noise sources if the gain fluctuations were not present. As the time over which the image is collected increases, the gain fluctuations also increase. In typical existing systems these gain fluctuations compromise performance, and in some cases, especially with long sensing periods, compromise performance significantly, thereby reducing effectiveness of concealed object detection. Therefore, radiometers employed for this purpose are usually fitted with a means for gain fluctuation compensation or removal.

Prior techniques employed for gain fluctuation or removal suffer from 1) added expense of components, 2) loss of signal at sensitive stages of electronic amplification in the case of a switch or significantly increased need for dynamic range in the case of a noise added radiometer, and 3) the loss of sensitivity by a factor of 2 in the cases of a switch or noise added radiometer.

Accordingly, need exists for a system and technique in which passive thermal images may be used for practical and safe detection of concealed objects on people and which does not suffer from the above described negative effects of gain fluctuation introduced by the imaging system during the detection process.

SUMMARY

The disclosed system and technique overcomes the weaknesses in the existing gain fluctuation techniques by switching the environmental temperature at a rate sufficiently fast enough to obtain subsequent samples in a time period where the gain has not fluctuated sufficiently to have a negative effect on detection sensitivity. This environmental temperature switching speed is the same as would be employed by a switch technique for gain fluctuation removal to obtain the same level of gain fluctuation removal.

The disclosed system and technique overcome the weaknesses of cost and lost sensitivity in the existing gain fluctuation compensation techniques by switching the environmental temperature at a rate fast enough to obtain subsequent samples in a time period where the gain has not fluctuated sufficiently to have a negative affect on detection sensitivity. This technique is utilized in conjunction with the method of subsequent subtraction of alternate samples which both reveals the reflectance of the scene and removes gain fluctuation, as further described herein.

The disclosed system and technique further eliminates the need for incorporation of expensive and electronically lossy components to achieve gain fluctuation reduction or elimination, and is more efficient than techniques which use a reference value. The disclosed system and technique utilizes the process of quickly changing the environmental temperature illuminating the scene in which the subject person is being sensed. By differencing images, or portions of images, of one environmental temperature from those sensed at another temperature, no reference value is used and therefore the system both removes gain fluctuation and achieves a high level of performance without incorporation of expensive and electronically detrimental components at each imaging channel.

As used herein the term "pointwise" refers to a process or operation in which each value in a first data set, e.g. one image, is processed to produce a value in a second data set, e.g. a second image, in correspondence with the first data set (first image) as is understood by one skilled in the art. "Pointwise" operations may take each value of one image and process it with some other variables and/or constants to produce each value in a corresponding second image, or it may take each value of any number of images from the same corresponding location, and processing those along with any number of constants and variables to produce some final values and/or any number of images again in correspondence.

According to one aspect of the disclosure, a system for imaging a subject at a scene comprises: A) an imaging device for capturing a plurality of image data samples at a sampling rate at least greater than a highest gain fluctuation rate of other components within the system with gain responses, the images containing both temperature and reflectance data; B) a device for synchronously changing illumination conditions at the scene between at least two different states for pairs of the plurality of image data samples, each image data sample of a pair containing both temperature and reflectance data; C) a memory coupled to the imaging device for storing pairs of the plurality of image data samples; and D) a processor coupled to the memory for creating a deriving a third image from the pair image data samples, the third image devoid of gain fluctuation. Such a system may operate on any subset of data from the imaging device, including a single sample at any instant, a final image or plurality of images being composed from data subsets. Any imaging device may be used with such system at any wavelength. In an alternate embodiment, the device for changing the environmental temperature of the scene may not change effective temperature, but may change illumination.

According to a second aspect of the disclosure, in a system for imaging a subject at a scene, the imaging system having at least one component with a gain response that fluctuates at a gain fluctuation rate introducing gain fluctuation affects into captured image data, a method of removing such gain fluctuations effects, comprises: A) obtaining a plurality of image data samples at a sampling rate at least greater than the gain fluctuation rate; B) synchronously changing illumination conditions at the scene between at least two different states for pairs of the plurality of image data samples, each image data sample of a pair containing both temperature and reflectance data; and C) deriving a third image from the pair image data samples, the third image devoid of gain fluctuation. In one embodiment, the third image is derived by pointwise subtracting data in a first image data sample of the pair from data in a second image data sample of the pair. In an alternate embodiment, the third image is derived by pointwise subtracting the data in a second image data sample of the pair from the data in a first image data sample of the pair. In another embodiment, the third image is pointwise multiplied by the respective environmental temperature, then pointwise subtracted from the first or second image, and then pointwise divided by the third image everywhere subtracted from the value 1 to produce a temperature image substantially devoid of reflectance information.

BRIEF DESCRIPTION OF THE DRAWINGS

Referring to the drawings.

DETAILED DESCRIPTION

Figure 1:
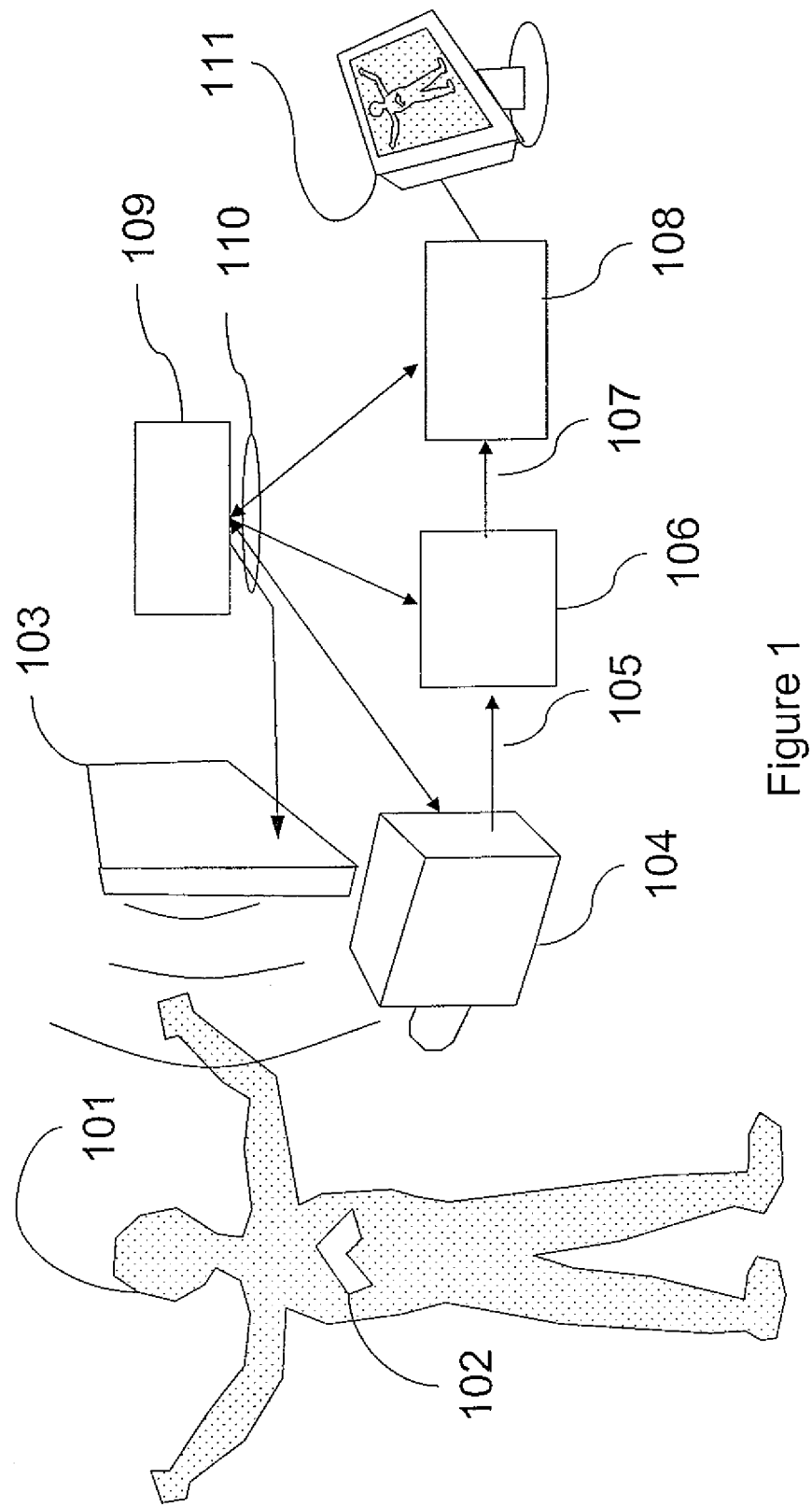
FIG. 1 depicts a system for obtaining passive thermal images of a subject and concealed objects in which the environmental temperature is controlled.

The various embodiments of the disclosed system and technique relate to passive millimeter wave imaging for concealed object detection, and more generally the use of any wavelength, infrared or longer, for that purpose, and, furthermore, where the subject is essentially illuminated by the environment, and in which some changes in that environment are employed to improve performance, including illumination changes. The term "thermal sensor" is used herein means any sensor which operates at any wavelength.

Utilizing the disclosed methods and apparatus, detection of the wide range of concealed object reflectivity, including both highly reflective objects and highly emissive/non-reflective objects, is possible, even where those objects may obtain any physical temperature, including that of a human subject. In one embodiment, an environmental temperature control device in one state provides one temperature and in another state provides a second temperature. A thermal sensor, such as a camera, records images of the subject under the two said temperature conditions of the environment. The two images are processed to reveal the reflectance of the subject and the concealed objects without regard to their physical temperature. This processed image then represents the various reflectances of the subject human, most of which are constant, and the reflectances of the concealed objects, most of which are different from the subject human. With this technique, representations useful to detection of the concealed objects may be obtained by the differencing of two images taken each at a different environmental temperatures. Since both images contain nearly the same values, the difference between the images reveals information useful for detection of concealed objects.

Millimeter waves are located in a part of the electromagnetic spectrum which has advantages in revealing objects concealed on humans because clothing is, for the most part, transparent at these wavelengths. The field of this disclosed system and technique is not limited to the millimeter wave portion of the spectrum because other wavelengths are useable for concealed detection on humans where the clothing is essentially transparent. The primary reason that these millimeter wavelengths and those nearby are often used is for practical reasons of size of optical elements and availability of affordable detection and amplification electronic devices. Optical element size is dictated by physical phenomena relating wavelength to resolution, and affordable electronics relies on the state of technology.

The disclosed system and technique relate to passive millimeter wave imaging for concealed object detection, and more generally, to the use of any wavelength, infrared or longer, for that purpose, where the subject is essentially illuminated by the environment, and in which some changes in that environment are employed to improve performance, including illumination changes. The disclosed system and technique overcome the effects of concealed object temperature in the use of thermal sensors for concealed object detection and reveal reflectivity by the creation of a reflectance image of the subject in a passive thermal imaging system.

In one embodiment, the subject is placed in a thermal environment which is normally at some temperature below normal room temperature. The subject does not necessarily sense this lower than normal temperature because the subject may be insulated from the low temperature environment at wavelengths that the subject normally senses temperature. One image or portion of an image is obtained from the subject when illuminated by this low temperature. An electronic device within the insulated chilled area then produces a second temperature at the wavelengths of interest, thereby bringing the effective temperature of the environment up to normal room temperature. A second image or portion of an image is obtained at this second illumination temperature. The two images, or portions of the two images, are then processed, primarily by subtraction, to produce a third image which is essentially a representation of the reflectance of the subject (and concealed objects) and is essentially devoid of subject and object temperature. Further processing may then also produce a fourth temperature image essentially devoid of subject and object reflectance. These third and/or fourth images may then be viewed or processed to reveal representations of all concealed objects which have reflectivity and/or temperature different from the human subject.

The sensed apparent radiometric temperatures of an object are a combination of the temperature of that object, the temperature of the environment which that object reflects to the radiometer, and the temperature of the object behind the object of interest, as viewed from the radiometer. This combination is approximated by Equation 1 below:

$$Ta=To*Eo+Te*Ro+Tb*Ao \qquad \text{Eq. 1}$$

where Ta is the resulting apparent temperature,
To is the temperature of the object,
Eo is the emissivity of the object,
Te is the temperature of the environment,
Ro is the reflectivity of the object,
Tb is the temperature of the object behind the object of interest as viewed by the radiometer, and
Ao is the transmissivity of the object.

For the purpose of this disclosure, the term Tb*Ao is ignored because highly transmissive objects are essentially transparent, such as clothing. The disclosed system and method perform a subtraction of two images or portions of images acquired under identical circumstances except that the environmental temperature has changed. Designating the first environmental temperature as Te1 and the second environmental temperature as Te2, the sensed radiometric value in environmental temperature condition 1 designated Ta1 is then defined by Equation 2 below:

$$Ta1=To*Eo+Te1*Ro \qquad \text{Eq. 2}$$

Similarly, the sensed radiometric value in environmental temperature condition 2 designated Ta2 is then defined by Equation 3 below:

$$Ta2=To*Eo+Te2*Ro \qquad \text{Eq. 3}$$

Subtraction of the value of Ta2 from Ta1 results in Equation 4 below:

$$\begin{aligned} Ta1-Ta2 &= ToEo-To*Eo+Te1*Ro-Te2*Ro, \\ &= Ro*(Te1-Te2), \\ &= Ro*k \end{aligned} \qquad \text{Eq. 4}$$

The resulting value of Equation 4 being referred to as the "reflectance" of the sensed data because the terms Te1 and Te2 are constants, and may be completely known and therefore the value "k" may be substituted for their difference, and the result is completely devoid of the temperature of the material. To reintroduce the term Tb*Ao it can further be shown that objects which have partial transmissivity (are partially transparent) will exhibit a value which is a mixture of the reflectance of the object and the reflectance of the background object as viewed from the radiometric sensor.

Furthermore, because emissivity and reflectivity generally sum to 1, and except for highly transparent objects, their actual temperatures, devoid of the effects of the environmental reflections upon them can be determined by processing the sensed values Ta with one of the known environmental temperatures Te1 and the reflectance value Ro obtained above.

$$Eo+Ro=1 \qquad \text{Eq. 5 (generally)}$$

Recall Eq. 2 Ta1=To*Eo+Te1*Ro
By substitution $$To=(Ta-Te1*Ro)/(1-Ro) \qquad \text{Eq 6.}$$

Where all the quantities on the right side are known.
Below is an example based on the above equations:

$$Ta=To*Eo+Te*Ro+Tb*Ao \qquad \text{Eq. 1}$$

where Ta is the resulting apparent temperature,
To is the temperature of the object for this example set to 305 Kelvin,
Eo is the emissivity of the object for this example set to 0.8,
Te is the temperature of the environment set to two states for this example, Te1=280 Kelvin, Te2=295 Kelvin,
Ro is the reflectivity of the object for this example set to 0.2,
Tb is the temperature of the object behind the object of interest as viewed by the radiometer for this example set to 305 Kelvin, and
Ao is the transmissivity of the object for this example set to 0 (zero)
Filling in Equations 2 and 3 yields:

$$Ta1=305*0.8+280*0.2=300 \text{ Kelvin} \qquad \text{Eq. 2}$$

$$Ta2=305*0.8+295*0.2=303 \text{ Kelvin} \qquad \text{Eq. 3}$$

The result from Eq. 4 is the difference between Ta1 and Ta2, namely Ro*k=3. Wherein if the two environmental temperatures are know then k=295−280=15. Solving for Ro yields Ro=3/15=0.2

As can be seen in the above example, the sensed values Ta1 and Ta2 of 300 and 303 Kelvin, respectively, result in a purely reflectance value Ro*k, wherein with knowledge of the difference between the two environmental temperatures k, the value of reflectance Ro is determined to be 0.2 which is the correct value, and is devoid of object temperature influence.

The original temperature To can be discovered from the known values and the derived reflectance Ro. In this example the sensed data Ta1=300 Kelvin and the reflectance derived Ro=0.2 using equation 4. Te1 in this example is known to be 280 Kelvin, so using equation 6, Te1*Ro=(280*0.2)=56, subtracted from Ta1 yields 244 for the numerator. 244 is divided by 1−R=(1−0.2)=(0.8) to yield a value for To of 305 Kelvin which is the correct value in this example.

FIG. 1 illustrates conceptually a thermal sensing system 100 for obtaining and displaying the reflectance and/or temperature of a scene containing a subject human 101 and possible concealed object 102. Thermal sensing system 100 comprises thermal emitter 103, imaging sensor 104, data storage device 106, processor unit 108, synchronization device 109 and display/signal unit 111. In the disclosed techniques, the scene is essentially illuminated by the thermal environment, which is provided synthetically by environmental thermal emitter 103 which can be operated in at least two states of temperature. The scene is imaged by imaging sensor 104 at some wavelength wherein the clothing of human 101 normally obscures the concealed object 102 in visual wavelengths, but in wavelength of the imaging sensor 104, such obscuring clothing is essentially transparent.

FIG. 1 further depicts the transference of data 105 which represents the sensor response in a numerical digital form such as a stream of numbers or other electrical analog form such as voltage over time. Such data 105 are stored temporarily in a data storage device 106 which may be digital or analog in nature. Synchronization device 109 provides signals 110 of at least an off and an on state, and distributes those signals to various components of the system, namely the thermal emitter 103, the sensor 104, the data memory unit 106 and the processor unit 108.

Data stored temporarily in the data storage unit 106 is transferred to the processing unit 108 which may be analog or digital, and wherein processing is performed, such processing may include, but is not limited to, the subtraction of the data collected at one of the synchronization states from the data collected at another of the synchronization states, as described herein as well as other possible functions. Display/signal unit 111 provides a visual display and/or signal to indicate the presence of concealed objects.

Figure 2A:
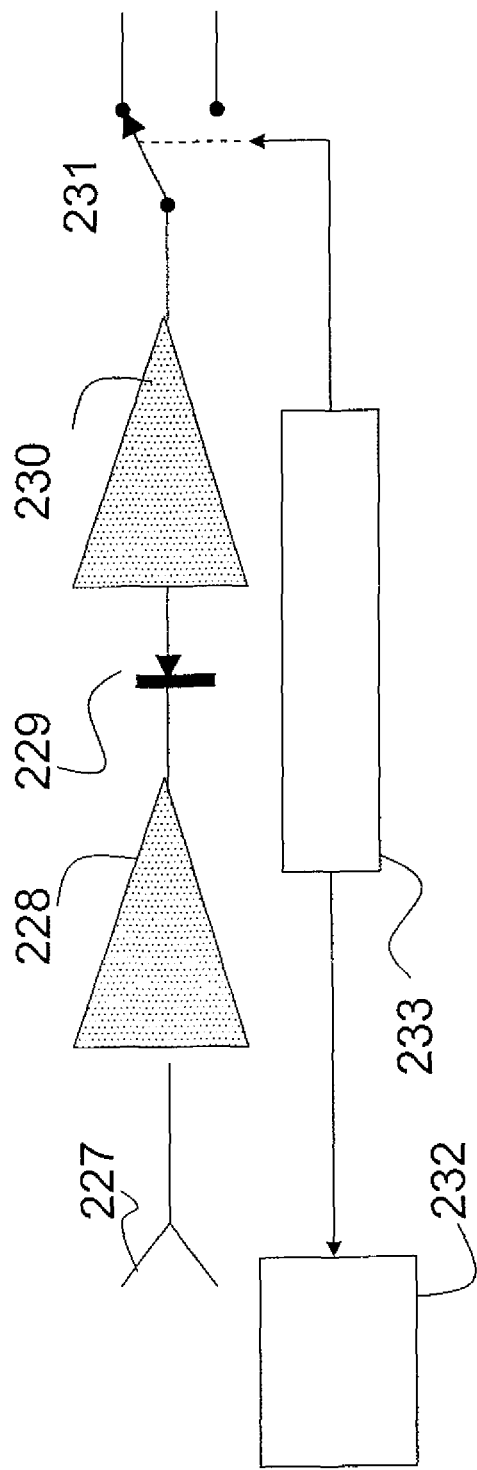
FIG. 2A is a schematic diagram of an electronic circuit for reducing or eliminating gain fluctuation in accordance with the disclosed system and technique.

FIG. 2A depicts a gain fluctuation removal circuit in accordance with the method of the disclosed system and technique. In FIG. 2A, an antenna or energy pick-up device 219 is employed to transduce electromagnetic energy from the scene into an electrical signal. That signal is input to low noise amplifier 228. The output of the low noise amplifier 228 is fed to detector 229 and the detected signal is fed to video amplifier 230. The output of the video amplifier 230 is fed to switch 231. A synchronization source 233 is fed to both an environmental temperature control device 232 and the switch 231. As the synchronization signals alter between two states, the scene is illuminated with two temperatures, and the detected signal from the scene is fed to alternate outputs, one representing the scene at one temperature and the other at the second temperature. A differencing operation between those two signals then represents the difference in the scene which, if properly controlled, reveals important representations of concealed objects. Because the gain in the circuit does not change appreciably during the sampling periods and the switching time, and because the two alternate sampled signals are differenced, the gain fluctuation is removed. In general, the output switch 231 may be instead a single converter device coupled to digital or analog memory and the synchronization signal can be made to cause a differencing of those digital or analog representations. Advantages of this approach include the lack of a lossy switch in the sensitive input path, no duplication of expensive components, and inclusion of the detector and video amplifier in the fluctuation removal path. Another major advantage is that this technique provides only root 2 (approximately 1.414) thermal sensitivity loss instead of a factor of 2 thermal sensitivity loss as would be the case with a reference switched input circuit. The above described technique works in those situations where the environmental temperature is controlled at a sufficiently high rate. In the disclosed embodiment, the environmental temperature control device 232 may be implemented with either thermal illumination devices 203 or 303, as described herein.

Figure 2B:
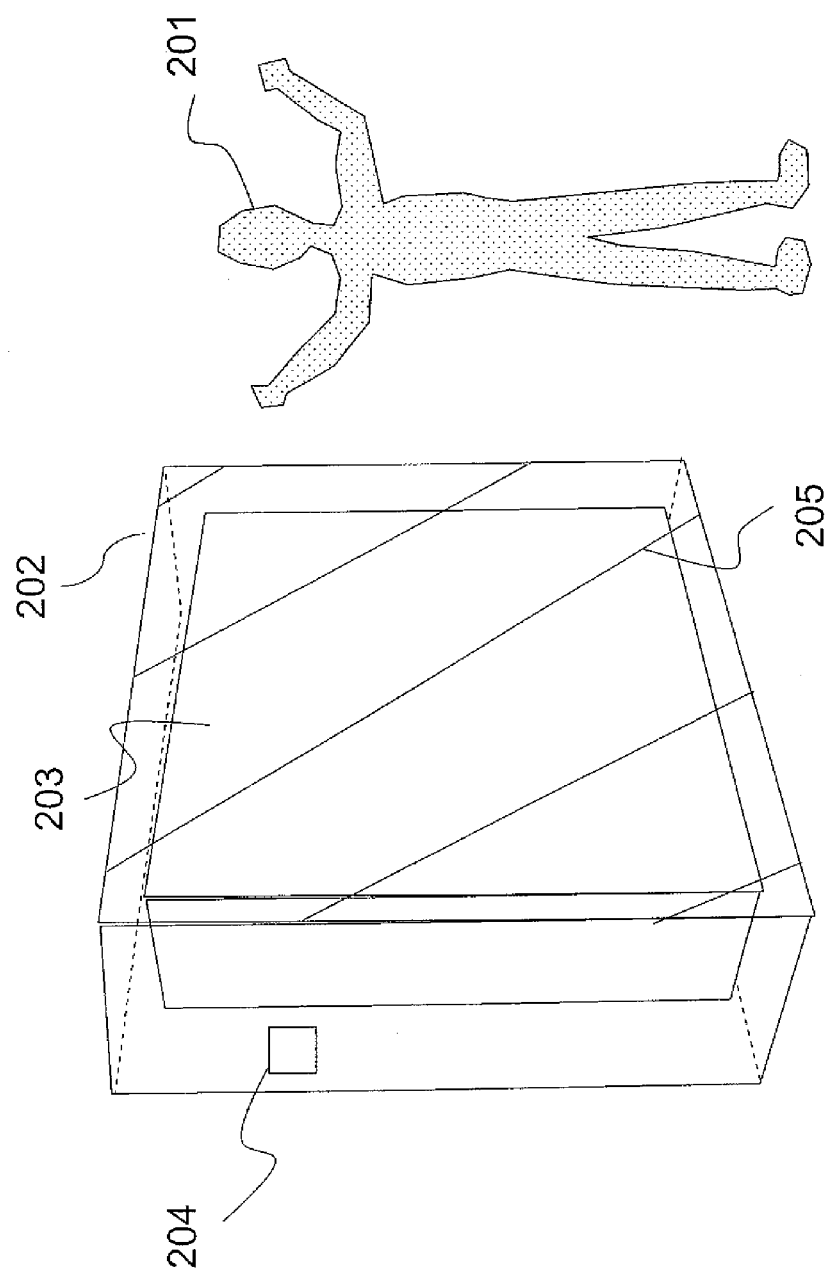
FIG. 2B illustrates a thermal illumination device which switches between at least two temperature states.

FIG. 2B depicts a thermal illumination device 202 wherein the interior 204 of the device is controlled so that it remains at a fixed temperature. An electronically controlled thermal emitter 203 embedded within this interior space 204 is capable of raising the apparent temperature of the enclosure when activated by the synchronization signal 110 of FIG. 1 (e.g. from synchronization source 233) to at least one of a set of thermal states. The result is the creation of at least two thermal illumination states, each of a different temperature, providing environmental temperatures for the subject 201. If necessary, an optional scattering material 205 may be employed to mix the temperature of the interior of the space 204 with the electronically controlled thermal emitter 203.

When the electronically controlled emitter 203 is in the off state, then the apparent temperature of the thermal illumination device 202 is that of the interior 204 physical temperature of the thermal illumination device. When the electronically controlled emitter 203 is in the on state, then the apparent temperature of the thermal illumination device 202 is a combination of the temperature of the interior 204 physical temperature and the controlled emitter 203 temperature. The effect of this embodiment is to modulate the scene illumination temperature in synchrony with the synchronization signal 110 of FIG. 1.

Thermal emitter 203 may be implemented with any of the following: gas discharge tubes wherein gasses, notably the noble gases, are brought to ionized (plasma) states by impressing of high voltage; electrically heated filaments, and electronically generated radio frequency noise sources. The latter can be expressed as multiple sources at different frequencies or broadband noise sources which mimic actual thermal energy. Distribution of electronically generated noise sources is difficult in that the distribution of the signal must be fairly uniform, have broad directionality, and be wide in spectral content. As described elsewhere, a thermally controlled surface of fairly large subtended angle as viewed by patches of the subject is necessary to effectively obtain a reflectance image for concealed object detection. In one embodiment, thermal emitter 203 may be implemented with an electronic noise module, model TN165, commercially available from High Energy Devices LLC, Maryland Heights, Mo., along with appropriate signal dividers and antennas such as those commercially available from Qinstar Technology, Inc of Torrance, Calif.

The interior space 204 may be set to a temperature below the normal room temperature and the temperature of the electronic emitter 203 may be set so that its highest temperature is at or below room temperature. By so doing the system does not increase the electromagnetic energy in the environment beyond that of the normal thermal environment at any and all wavelengths.

Figure 3:
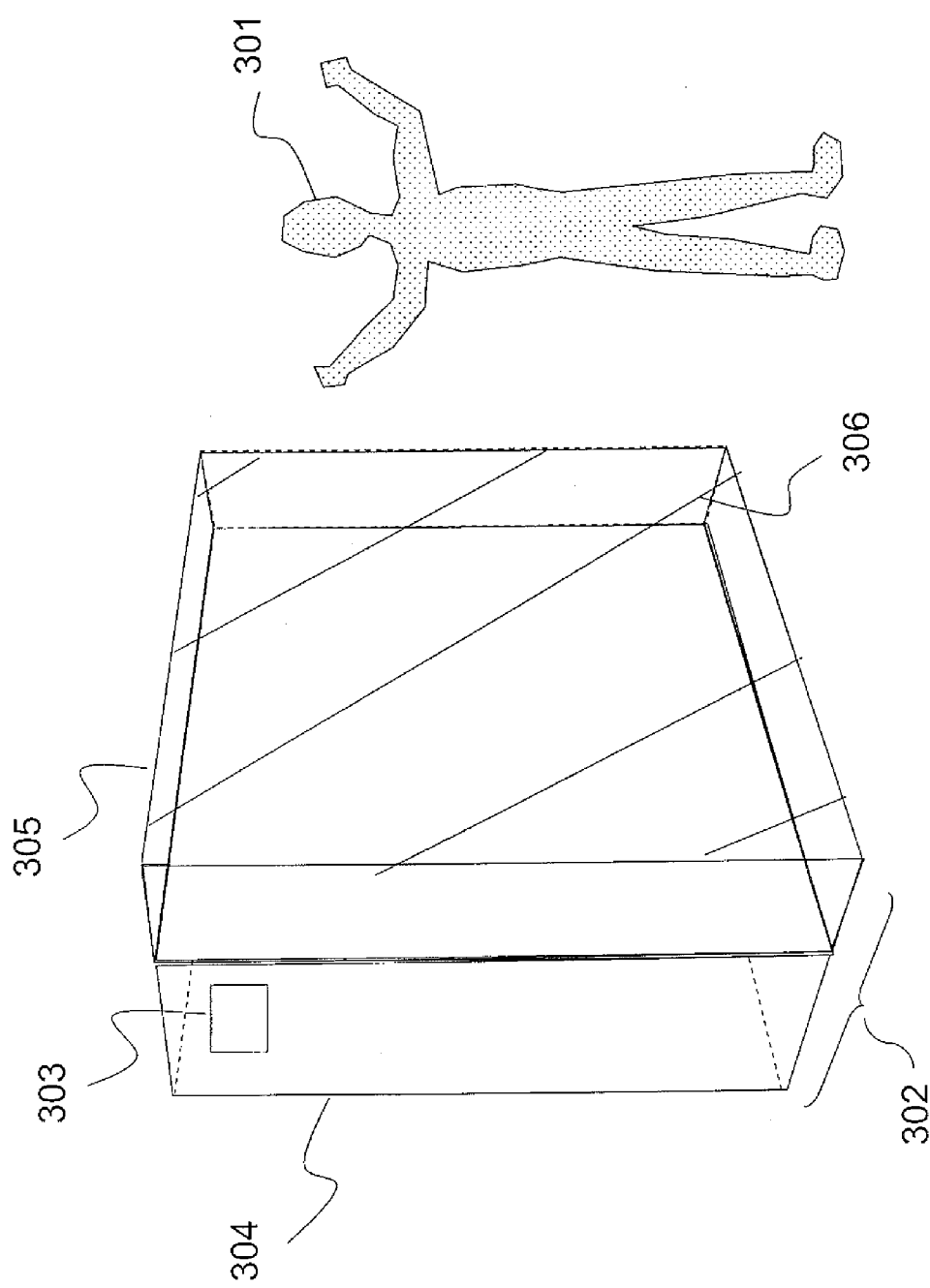
FIG. 3 illustrates a mechanical system of thermal illumination which switches between at least two temperature states.

FIG. 3 depicts another embodiment of a thermal illumination device 302, wherein an interior 303 of a first chamber 304 of the device 302 is controlled so that it remains at a fixed temperature. An electronically controlled mechanical device 305 on the exterior of first chamber 304, but between the first chamber 304 and the subject 301, exhibits a temperature different from the interior 303 of the chamber 304. The synchronization signal 110 of FIG. 1 (e.g. from synchronization source 233) provides electronic control to select one of at least two thermal states, which is then used to activate the mechanical device within 305 which by occlusion of the fixed internal temperature by its own temperature therefore alters the thermal state of the entire illumination device 302. The effect of this embodiment is to modulate the scene illumination temperature in synchrony with the synchronization signal 110 of FIG. 1. If necessary, an optional scattering material 305 may be employed to mix the temperature of the interior of the space 303 with the mechanically controlled thermal subsystem 306.

The interior space 303 of chamber 304 may be set to a temperature below the normal room temperature and the temperature of the mechanical devices of 302 may be set so that at their highest temperature they are at or below room temperature. By so doing the system does not increase the electromagnetic energy in the environment beyond that of the normal thermal environment at any and all wavelengths.

Figure 4:
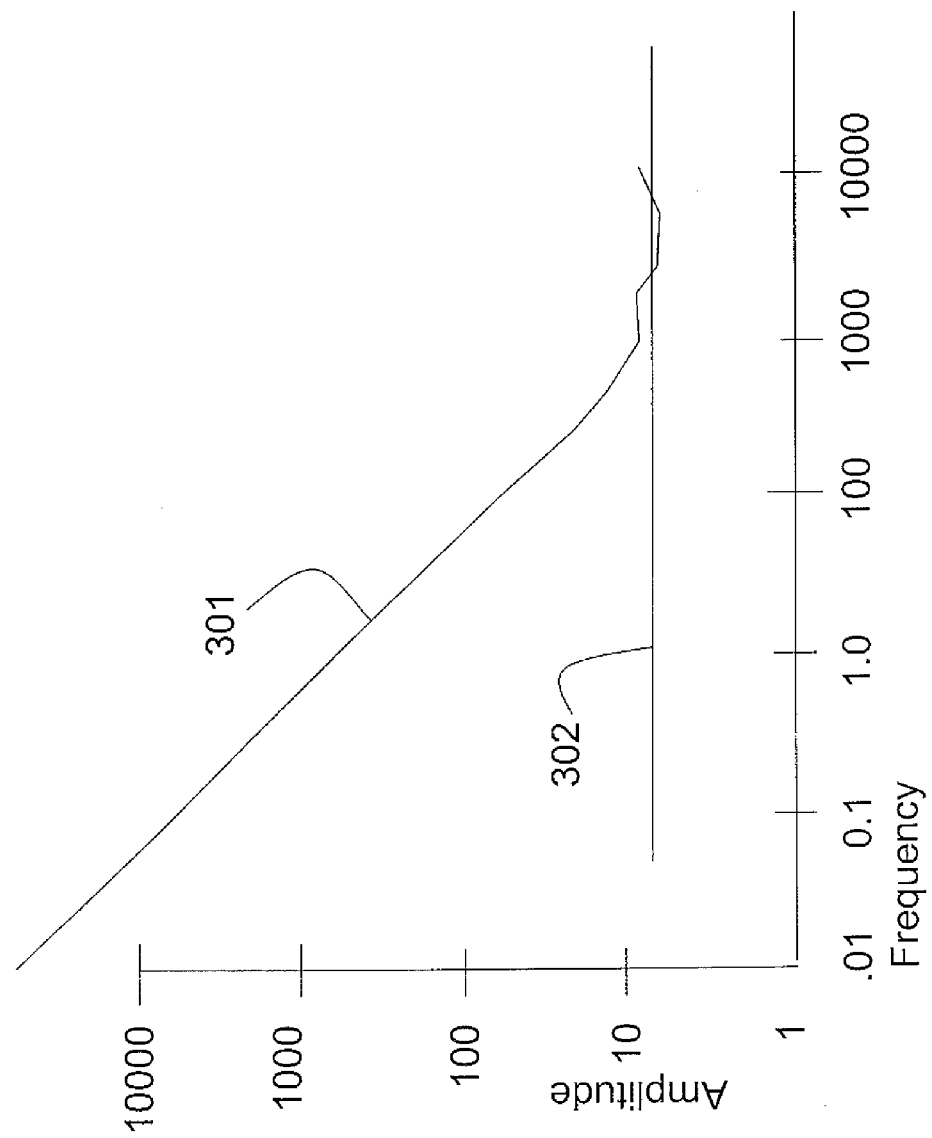
FIG. 4 depicts a graphical representation of the relationship between gain fluctuation amplitude and frequency.

FIG. 4 depicts a graphical representation of the relationship between the amplitude of gain fluctuations and frequency, the graph being for illustration purposes and not specific to any particular radiometer or technology, although a typical modern radiometer might exhibit characteristics very similar to such representation. In the graph, which is normally displayed with logarithmic axes, the spectrum of a thermal source, such as the thermal noise sources in the electronic components in a radiometer, are shown as line 402. The recorded noise spectrum from the radiometer is shown as line 401 which contains the obvious gain fluctuation spectrum from about 100 Hz down to 0.01 Hz and a combination of the gain fluctuation and the thermal noise and frequencies higher than 1000 Hz.

Figure 5:
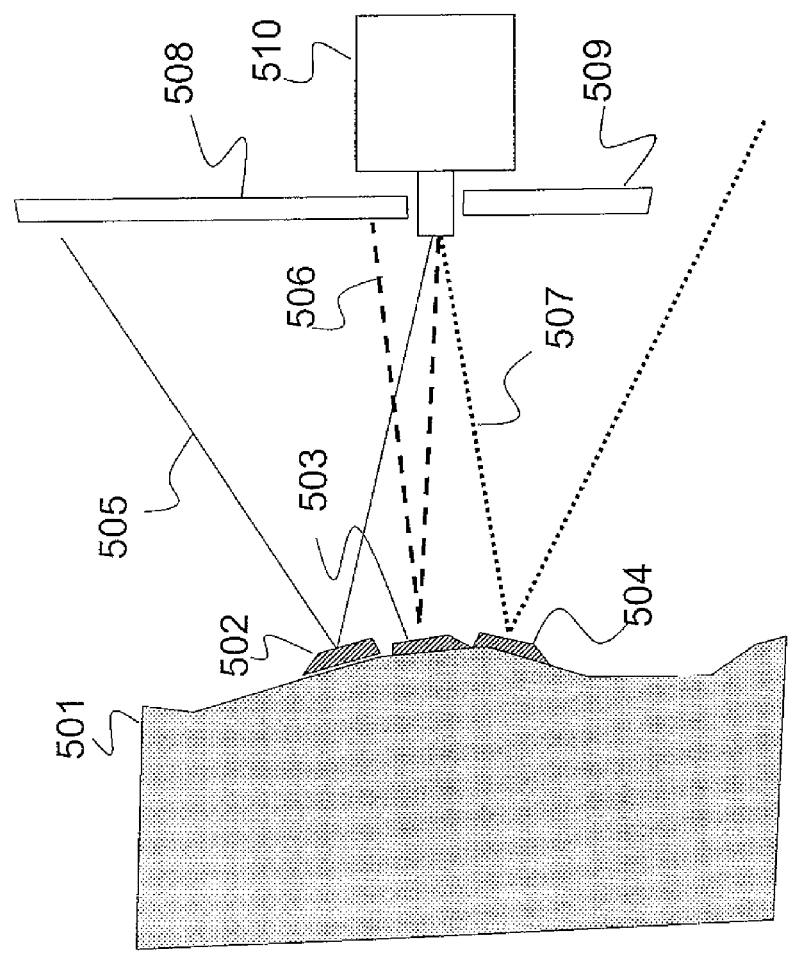
FIG. 5 depicts conceptually a variety of examples of patches on the subject or concealed object at orientations with respect to a sensor and the thermal illumination device.

FIG. 5 depicts a variety of examples of patches on a subject or concealed object at orientations with respect to the sensor and the thermally controlled illumination device. In order to obtain an essentially reflectance image, the environmental temperature should be presented as a thermally controlled surface of fairly large subtended angle as viewed by patches of the subject. Each patch of the subject or concealed object is presented in a manner that the patch reflects some portion of the environment towards the sensor. If the subtended angle of the thermally controlled surface is small, then the angles over which the patch will reflect the controlled temperature to the sensor is also small. A perfect thermally controlled surface would subtend the entire sphere centered on the subject, however, such a device is inherently impractical both in the consumption of space and cost. Generally, only those patches near the edges of the subject, as viewed from the sensor, are likely to reflect temperatures outside the hemisphere on the sensor side of the subject. Practical systems may be constructed where even smaller portions of the environment than the hemisphere are controlled. The subject and concealed object is represented by 501 as a body with a surface oriented generally toward both the sensor 510 and the thermally controlled illumination sources 508 and 509. Three patches of the subject or concealed object are shown by 502, 503 and 504. Lines showing the portion of the environment reflected to the sensor by the patches are shown by 505 for patch 502, by 506 for patch 503 and by 507 for patch 504, respectively. In this example, the environment that strongly affects the reflected energy, as sensed by the sensor 510, is the thermally controlled device 508 for the case of patches 502 and 503, because the thermal environment which those patches reflect into the sensor includes a direct path from the device 508 and that for patch 504, the thermally controlled device 509 is not strongly affecting the sensed reflected energy because the thermal environment which that patch reflects in the sensor does not include a direct path from the device 509.

Figure 7:
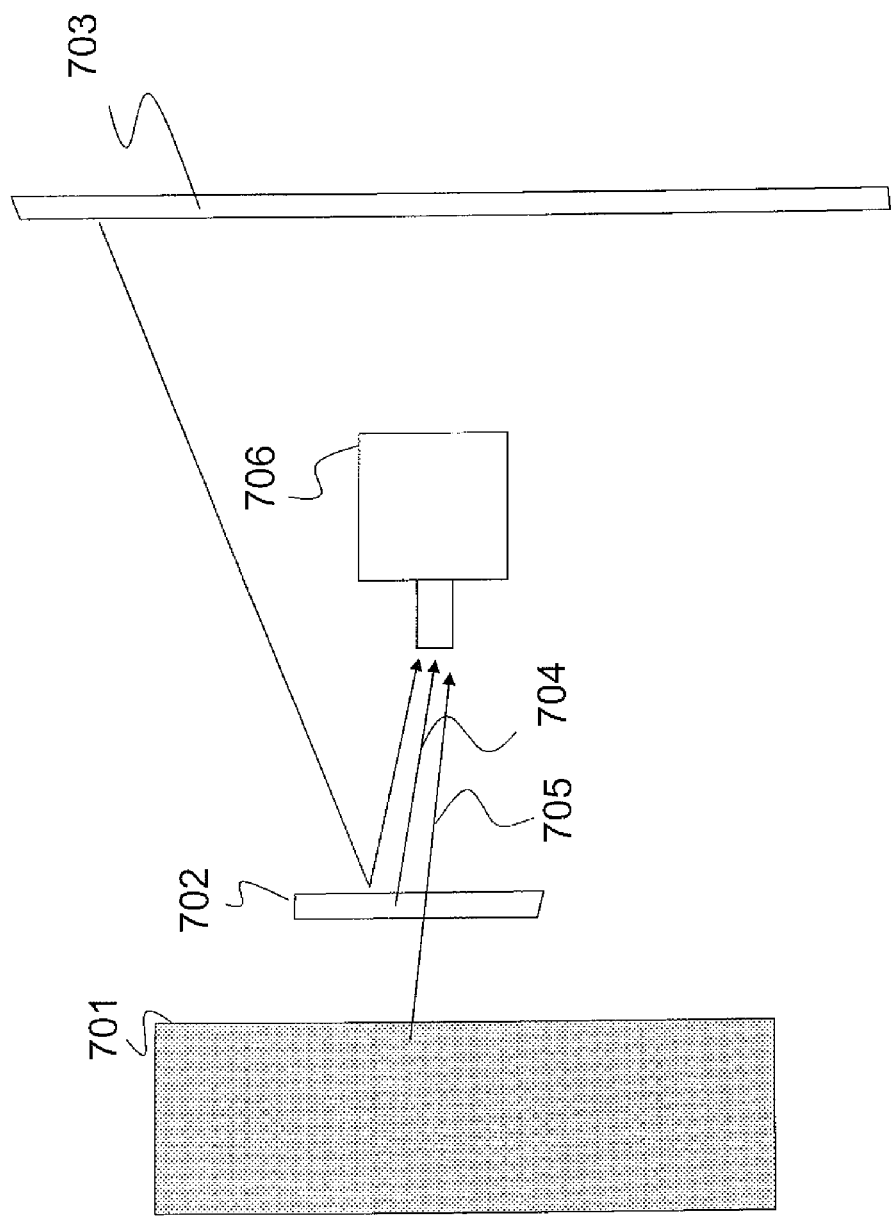
FIG. 7 depicts the thermal condition of an object as sensed by a radiometric sensor.

FIG. 7 depicts the radiometric scene including essential components as sensed by a radiometer. In FIG. 7, the foreground object 702 posses properties of emissivity, reflectivity and transmissivity. Those properties contribute to the sensed temperature sensed by the radiometer 706. The temperature of the environment 703 is reflected to the radiometer 706 in accordance with the reflectivity of the object 702 as depicted in the line 704. The temperature of the object 702 is sensed by the radiometer 706 in accordance of the emissivity of the object 702 as depicted in the line 704. The temperature of the background body 701 is sensed by the radiometer 706 in accordance with the transmissivity of object 702 as depicted in the line 705. All these sources of energy are summed at the radiometer to form one temperature being sensed and so the sensed temperature is a combination of the three properties of the object, the object's temperature, the environmental temperature and the background body temperature.

One advantage the disclosed system 100 utilizing the circuit of FIG. 2A has over the existing systems is that the reduction in thermal sensitivity obtained by the disclosed system and technique is on the order of root 2 rather than 2 as with a switch technique. The reason is as follows. The use of a switch which connects the electronics to the reference value during ½ of the operating time will loose ½ of the time which otherwise would have been available to sense the scene. Because sensitivity is proportional to the inverse of the root of time, a loss of sensitivity of root 2 occurs because the radiometer is not sensing the scene for ½ of the time. During the other ½ of the time, the radiometer is sensing the reference value, and then the two values are differenced. The differencing operator increases the R.M.S. value of the noise by a factor of root 2. The first factor of root 2 times the second factor of root 2 yields a total factor of 2 decrease in sensitivity (factor of 2 increase in RMS value of the thermal image). In the case of the disclosed system and technique, the system senses the scene during both halves of the divided time period eliminating that root 2 factor. However, those two halves are differenced, as described herein, therefore the RMS is increased by root 2.

The disclosed circuit illustrated in FIG. 2A is utilized in conjunction with a dual temperature technique which switches between the two illumination temperatures very quickly, e.g. on the order of one thousand times per second. To obtain reflectance, one illumination temperature image is subtracted from the other illumination temperature image, regardless of the speed of acquiring the two temperature images as long as the subject has not moved appreciably between the two exposures. With fast switching, and by performing subtraction of alternate samples, gain fluctuations are eliminated simultaneously during acquisition of the dual temperature data.

Figure 6A:
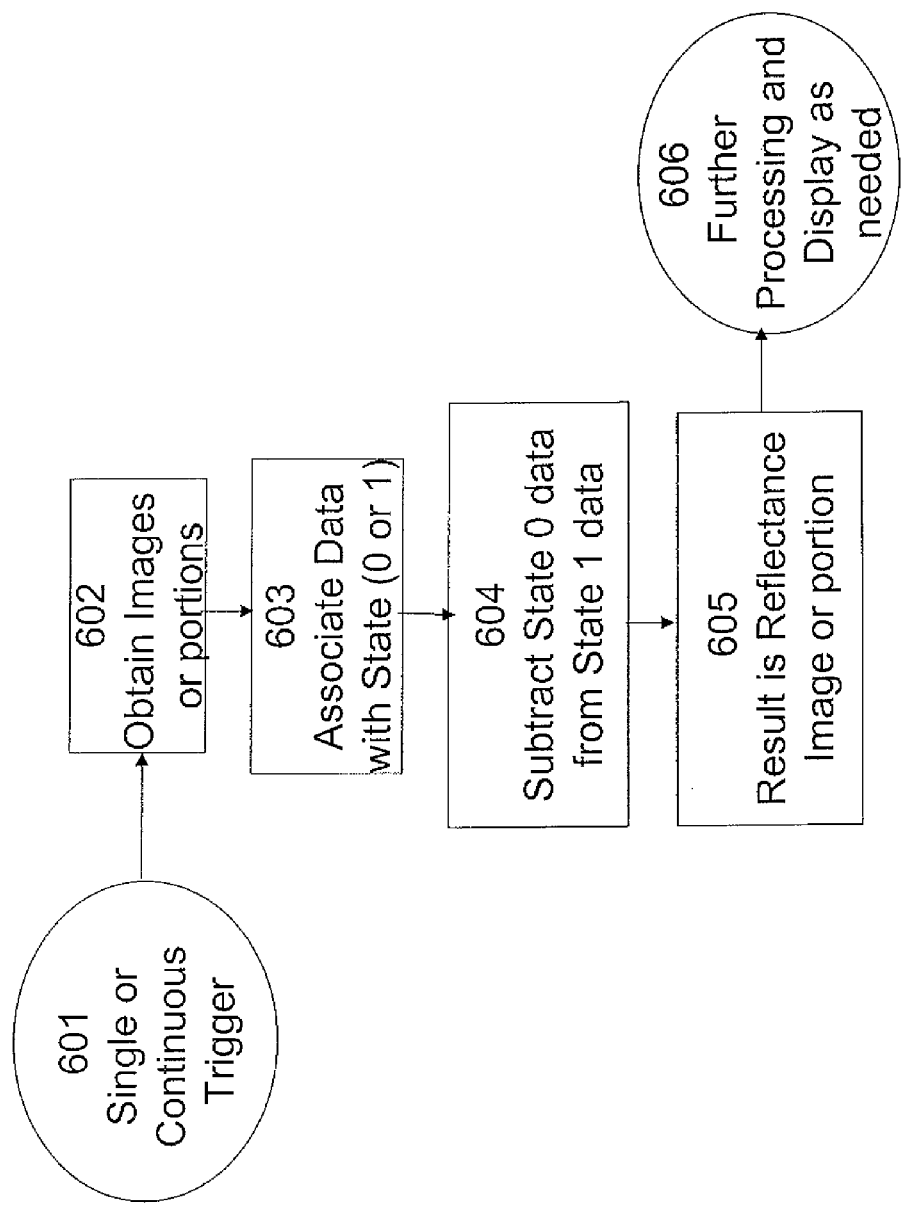
FIGS. 6A-B are conceptual flow diagrams illustrating the disclosed method for object detection using dual temperature images.
Figure 6B:
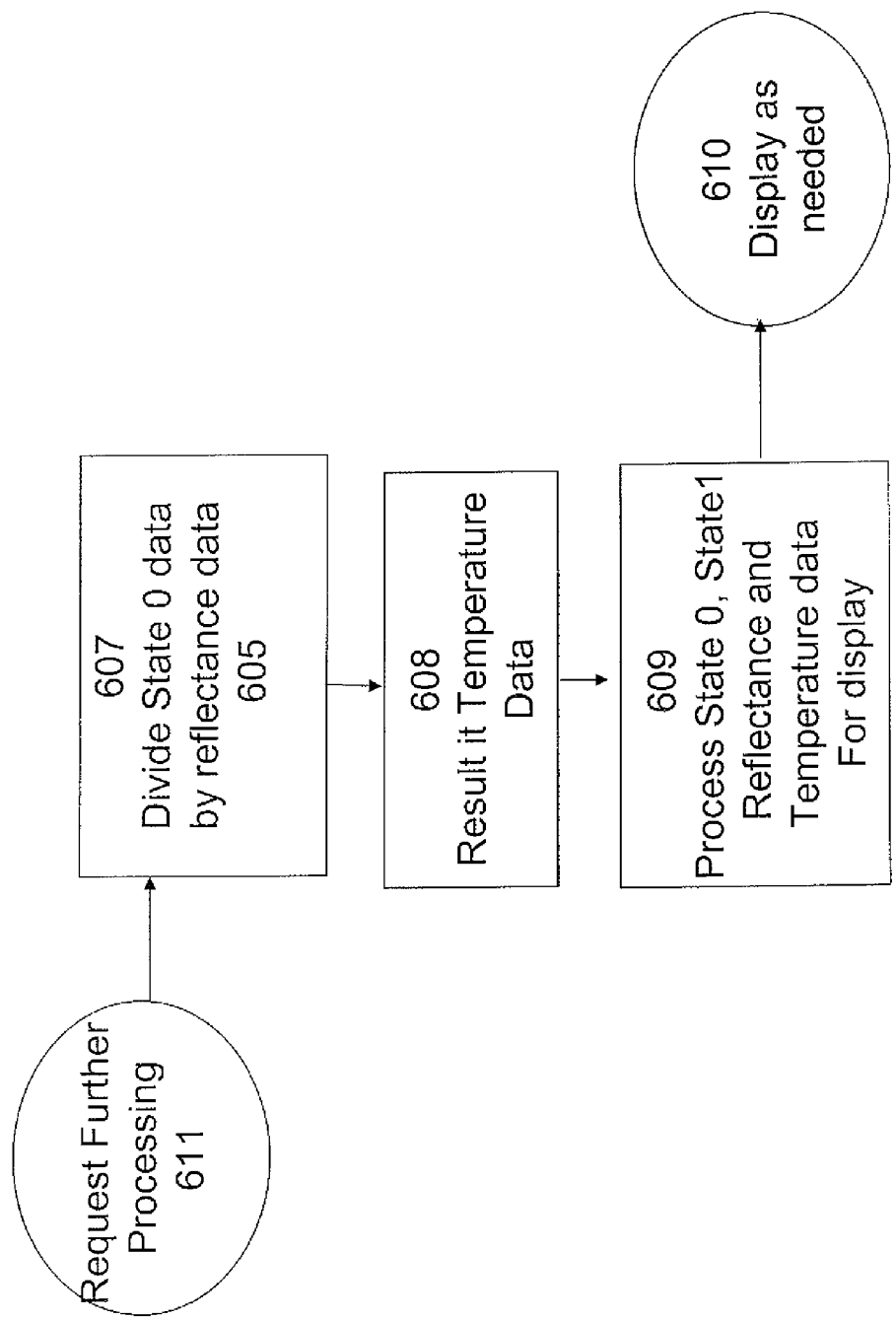

As depicted in FIGS. 6A-B the processes of the systems and apparatus described with reference to FIGS. 1-5 are utilized in conjunction with the dual temperature technique which switches between the two illumination temperatures. Starting with process block 601, individual or continuously triggered commands initiate the acquisition of data and an image or portion of an image is obtained at some environmental temperature state, as illustrated by process block 602. That environmental temperature state is associated with the data, as illustrated by process block 603. Data from alternate states are differenced, as illustrated by process block 604. The resulting data set is a reflectance image, as illustrated by process block 605. Optionally, further temperature images are processed, as illustrated by process block 606 and FIG. 6A and as described in more detail with reference to FIG. 6B. In process block 607, the State 0 (or the State 1) data are divided by the reflectance data generated at process block 605 if it is advantageous to provide temperature results devoid of reflectance, as illustrated by process block 608. In process block 609 all of the data are prepared as images or portions of images for display purposes, including any image processing to detect concealed objects, and such data displayed on a display apparatus, as illustrated by process block 610.

In one embodiment, an entire image may be formed from acquired image portions. These image portions or "subsets" may be any portion of an entire image, wherein a set of these subsets are combined to form an entire image. In an ongoing image formation process which may produce successive images, whether from the same subject as might be needed for a real-time sequence or from successive subjects, each full image may be composited from subsets, that full image being one of a sequence of images. Furthermore, each image instance may be plural in nature, as described herein, that plurality comprising images from different environmental temperature states and different processing results from those images. A plurality of images might compose four separate images as follows: A state 0 image as acquired at a state 0 environmental temperature, a state 1 image as acquired at a state 1 environmental temperature, a reflectance image as obtained by differencing state 0 and state 1 image subsets and accumulating those reflectance subsets into a reflectance image, and a temperature image as obtained by use of reflectance subsets, acquired subsets, and other data, those temperature subsets then accumulated to form a temperature image.

Figure 6C:
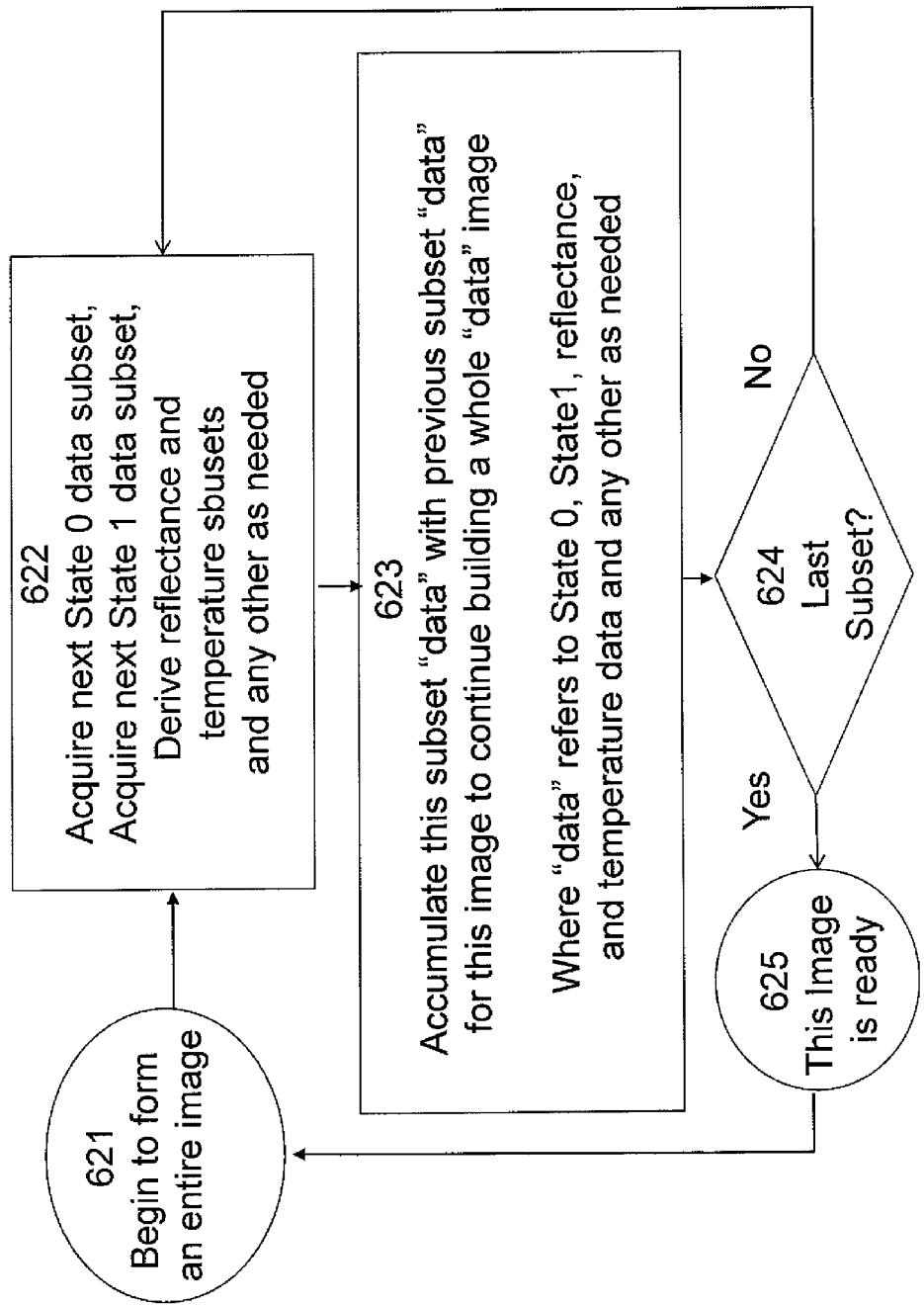
FIG. 6C illustrates the iterative process of acquiring, processing and composing individual image data subsets into composite image of a subject.

As shown in the FIG. 6C, some beginning state 621 triggers the first acquisition of a plurality of subsets for the first full images or as an ongoing process, the first plurality of subsets acquisition for some subsequent full image is triggered. Process block 622 represents the acquisition of two subsets, one of each state of the alternate environmental temperature states as described herein. Process block 622 also represents that processing necessary to derive other subsets which represent the reflectance state and the temperature state, as described elsewhere herein. Without loss of generality, the invention described herein might derive only one, any, or all of these subsets, or perhaps also other processing results not described herein. An image accumulator or other such mechanism is used to compose an entire image from subsets by the incorporation of those subset data together with other subset data until that image is fully formed as is understood by one skilled in the art. In this case, a plurality of subsets is being accumulated to form a plurality of respective images. Process block 623 represents the combination of each subset data set with the accumulated subset data set for the respective image accumulator. Decision block 624 represents the determination if this is the final subset needed to compose an desired image. If not, the next plurality of subset data are acquired, as illustrated by process block 622. If it is the last subset, then the frame is complete (notified by 625), and the next frame is started as indicated in the process block 621.

The present invention is illustratively described above in reference to the disclosed embodiments. Various modifications and changes may be made to the disclosed embodiments by persons skilled in the art without departing from the scope of the present invention. Accordingly, the appended claims shall not be limited by the particular features which have been shown and described, but shall be construed also to cover any obvious modifications and equivalents thereof.

What is claimed is:

1. In a system for imaging a subject at a scene, the imaging system having at least one component with a gain response that fluctuates at a gain fluctuation rate introducing gain fluctuation affects into captured image data, a method of removing such gain fluctuations effects, comprising:

obtaining a plurality of image data samples at a sampling rate at least equal to or greater than the gain fluctuation rate;

synchronously changing illumination conditions at the scene between at least two different states for pairs of the plurality of image data samples, each image data sample of a pair containing both temperature and reflectance data; and deriving a third image from the pair image data samples, the third image substantially devoid of gain fluctuation.

2. The method of claim 1 wherein the third image is derived by pointwise subtracting data in a first image data sample of the pair from data in a second image data sample of the pair.

3. The method of claim 1 wherein the third image is derived by pointwise subtracting the data in a second image data sample of the pair from the data in a first image data sample of the pair.

4. The method of claim 1 wherein the third image is pointwise multiplied by the respective environmental temperature, then pointwise subtracted from the first or second image, and then pointwise divided by the third image everywhere subtracted from the value 1 to produce a temperature image substantially devoid of reflectance information.

5. The system of claim 1 wherein obtaining a plurality of image data samples at a sampling rate at least equal to or greater than the gain fluctuation rate comprises:

obtaining a plurality of image data samples at any wavelength.

6. The system of claim 1 wherein synchronously changing illumination conditions at the scene comprises: changing the effective temperature of the scene.

7. The system of claim 1 wherein synchronously changing illumination conditions at the scene comprises: changing the wavelengths at which the imaging device operates.

8. a system for imaging a subject at a scene comprising:

an imaging device for capturing a plurality of image data samples at a sampling rate at least equal to or greater than a highest gain fluctuation rate of components within the system with gain responses, the images containing both temperature and reflectance data;

a device for synchronously changing illumination conditions at the scene between at least two different states for pairs of the plurality of image data samples, each image data sample of a pair containing both temperature and reflectance data;

a memory coupled to the imaging device for storing pairs of the plurality of image data samples; and a processor coupled to the memory for creating a derived third image from the pair image data samples, the third image devoid of gain fluctuation.

9. The system of claim 8 wherein the third image is derived with the processor by pointwise subtracting data in a first image data sample of the pair from data in a second image data sample of the pair.

10. The system of claim 8 wherein the third image is derived with the processor by pointwise subtracting the data in a second image data sample of the pair from the data in a first image data sample of the pair.

11. The system of claim 8 wherein the third image is pointwise multiplied by the respective environmental temperature, then pointwise subtracted from the first or second image, and then pointwise divided by the third image everywhere subtracted from the value 1 to produce a temperature image substantially devoid of reflectance information.

12. The system of claim 8 wherein the processor is configured to operate on any subset of data from the imaging device including a single sample at any instant, and wherein a final image or plurality of images are composed from said data subsets.

13. The system of claim 8 wherein the imaging device may operate at any wavelength.

14. The system of claim 8 wherein the device for synchronously changing illumination conditions at the scene changes the effective temperature of the scene.

15. The system of claim 8 wherein the device for synchronously changing illumination conditions at the scene changes the illumination on the subject at the wavelengths at which the imaging device operates.

* * * * *